(12) United States Patent
Burdick et al.

(10) Patent No.: US 6,250,726 B1
(45) Date of Patent: *Jun. 26, 2001

(54) SPROCKETED IDLER FOR A TRACK ASSEMBLY

(75) Inventors: Jon S. Burdick, Pekin; Jerry D. Fidler, Mossville; Roger E. Lawson, Brimfield, all of IL (US)

(73) Assignee: Caterpillar Inc., Peoria, IL (US)

( * ) Notice: Subject to any disclaimer, the term of this patent is extended or adjusted under 35 U.S.C. 154(b) by 89 days.

(21) Appl. No.: 08/915,706

(22) Filed: Aug. 21, 1997

(51) Int. Cl.$^7$ .................................................. B62D 55/12
(52) U.S. Cl. ........................... 305/195; 305/123; 305/199
(58) Field of Search .................... 305/135, 195, 305/199, 103, 104, 123, 194, 196, 198, 200, 201; 474/901, 902, 210–213, 228

(56) References Cited

U.S. PATENT DOCUMENTS

| | | | |
|---|---|---|---|
| 994,317 | * 6/1911 | Holt | 305/135 |
| 1,112,460 | * 10/1914 | Leavitt | 305/135 |
| 1,228,709 | * 6/1917 | Stark | 305/195 |
| 1,636,829 | * 7/1927 | Neighbour | 305/135 |
| 2,416,679 | * 3/1947 | Curtis | 305/135 |
| 2,467,947 | * 4/1949 | Skelton | 305/135 |
| 2,827,337 | 3/1958 | Buffum | 305/10 |
| 3,586,393 | * 6/1971 | Myers | 305/195 |
| 3,841,424 | * 10/1974 | Purcell et al. | 305/135 |
| 3,912,336 | * 10/1975 | Ritter, Jr. et al. | 305/135 |
| 4,034,618 | * 7/1977 | Groff et al. | 305/199 |
| 4,106,822 | 8/1978 | Lee | 305/28 |
| 4,126,359 | * 11/1978 | Holze | 305/195 |
| 4,175,796 | * 11/1979 | Boggs et al. | 305/199 |
| 5,016,945 | * 5/1991 | Bentz | 305/195 |
| 5,183,318 | 2/1993 | Taft et al. | 305/39 |
| 5,273,126 | * 12/1993 | Reed et al. | 305/135 |
| 5,303,992 | 4/1994 | Grainger | 305/46 |
| 5,393,134 | * 2/1995 | Oertley | 305/199 |
| 5,829,849 | * 11/1998 | Lawson | 305/199 |

* cited by examiner

*Primary Examiner*—S. Joseph Morano
*Assistant Examiner*—Long Nguyen
(74) *Attorney, Agent, or Firm*—Richard A. Alsup; Jeffrey L. Myers

(57) ABSTRACT

In the operation of conventional track assemblies it is common for an idler to have a pair of laterally extending wear treads to engage and support the wear rails defined by the track links of the track assembly as it is driven thereabout. This ultimately creates an arcuate wear pattern on the wear rails of the track links creating an extremely rough ride when the wear rails contact the track rollers suspended from a roller frame. The present invention provides a sprocketed idler that contacts a roller bushing that extends between a pair of chain assemblies defined by the track assembly to support the track assembly as it is rotated therearound. The sprocketed idler with roller bushings provides lateral guidance for the track assembly and, in combination with the roller bushings, provides noise reduction compared to conventional track assemblies.

15 Claims, 4 Drawing Sheets

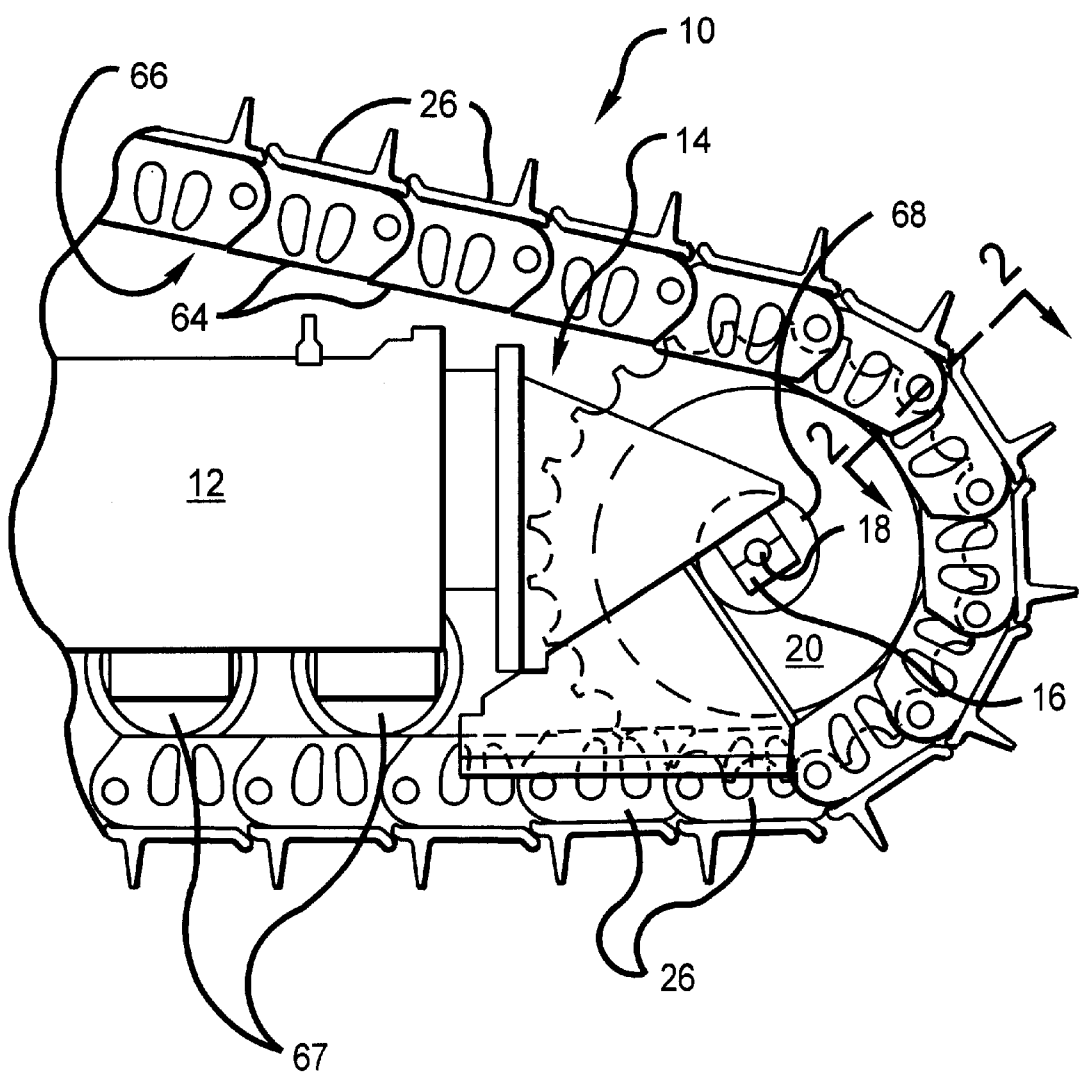
Fig. - 1 -

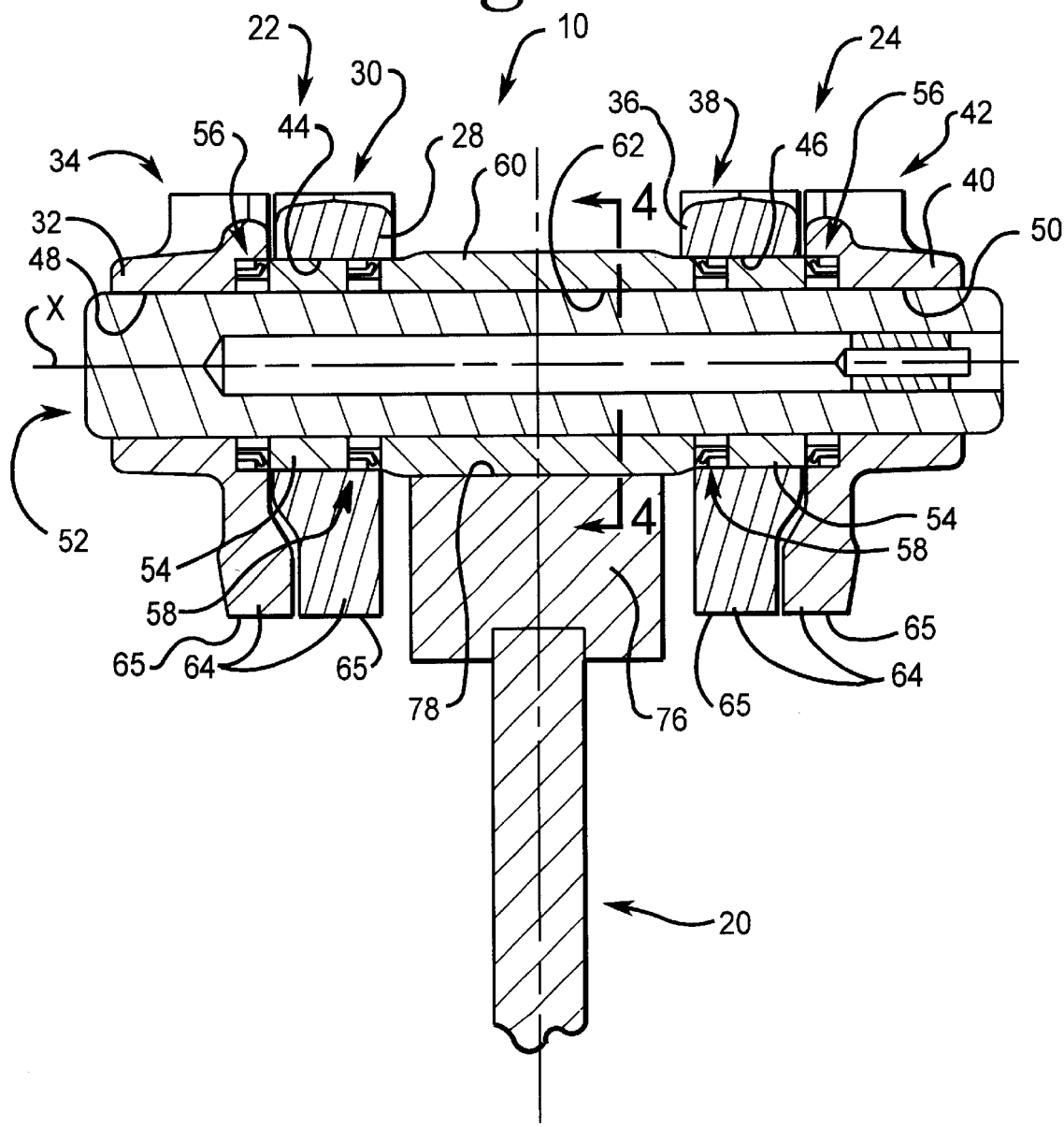
*Fig. - 2 -*

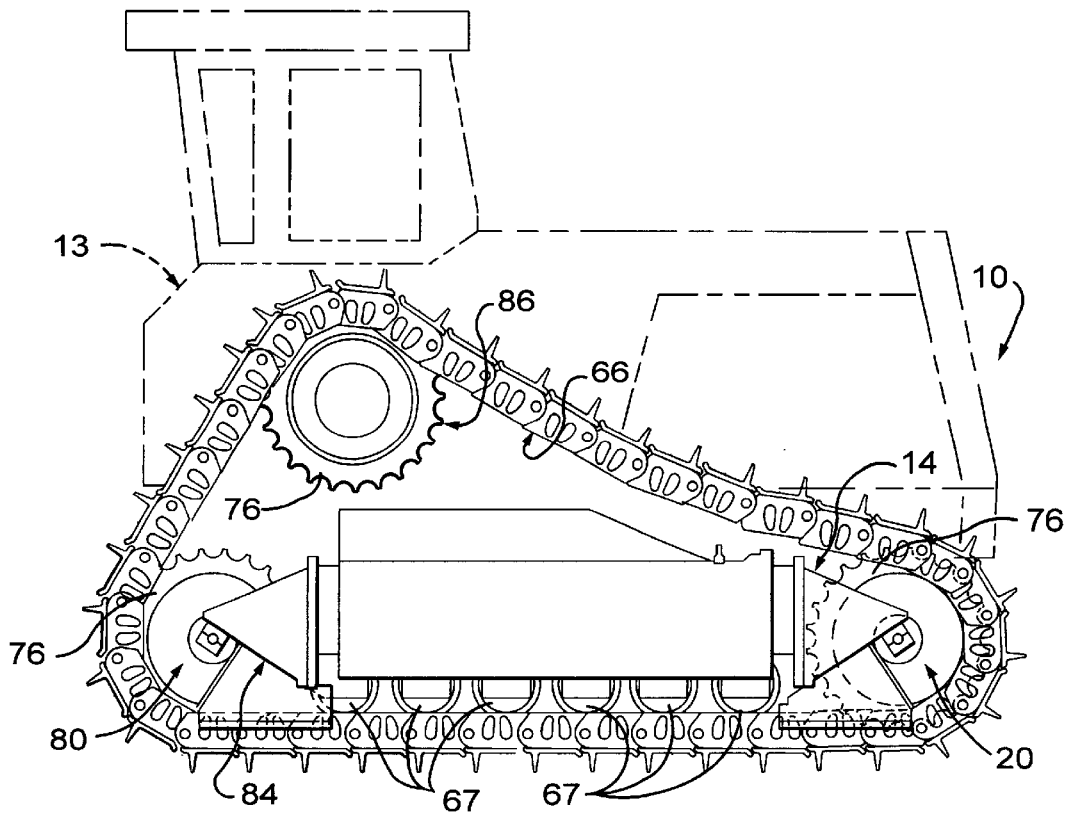
Fig. - 3 -
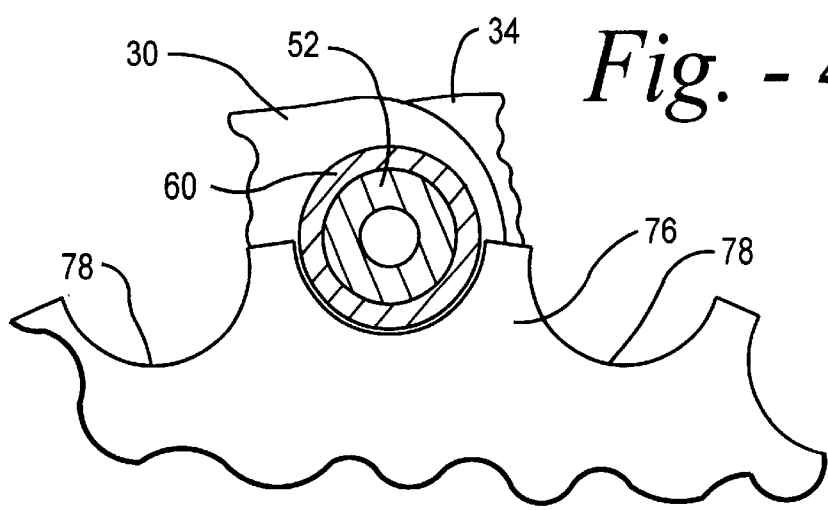
Fig. - 4 -

*Fig. - 5 -*
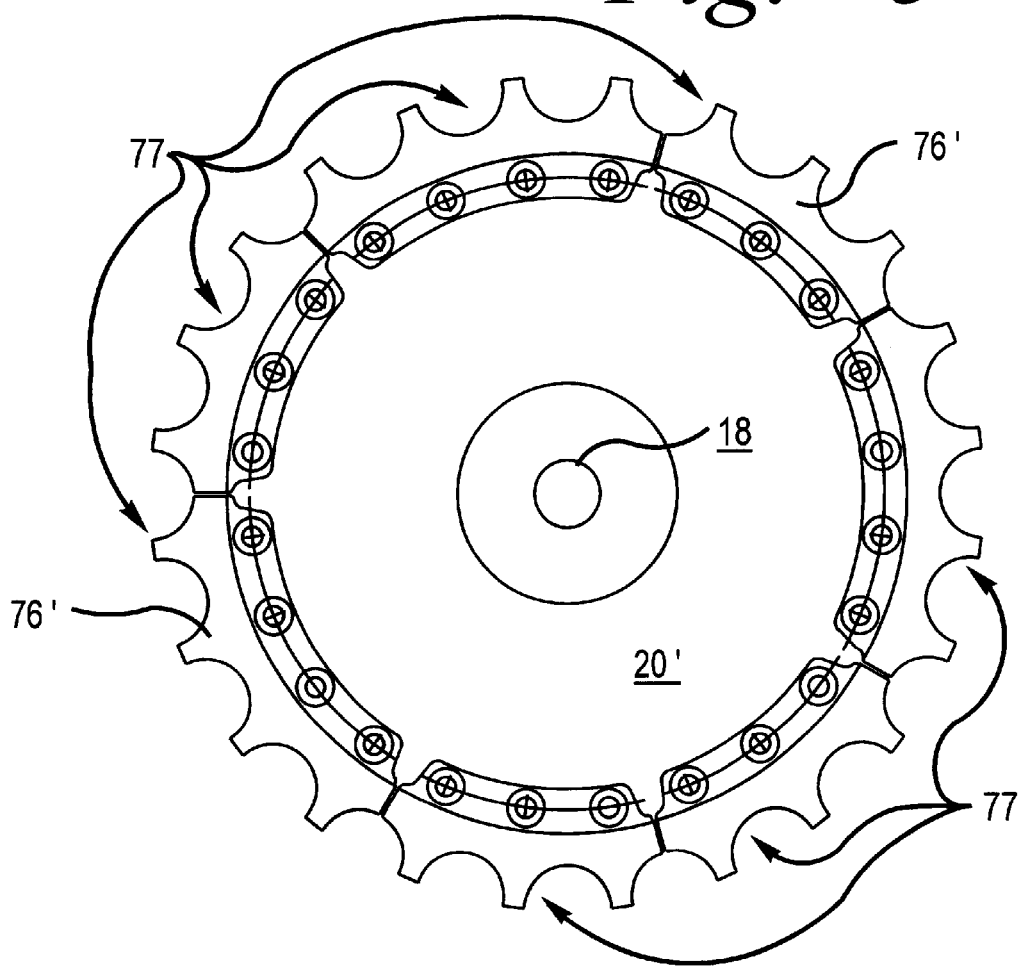
*Fig. -6 -*
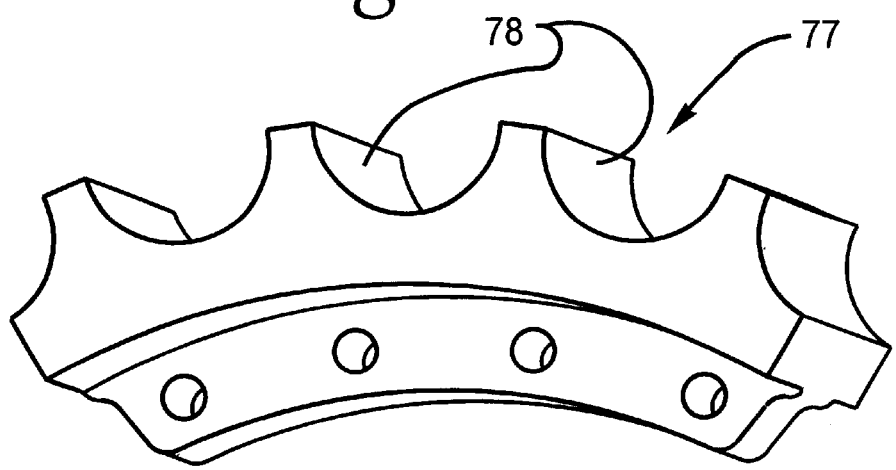

SPROCKETED IDLER FOR A TRACK ASSEMBLY

TECHNICAL FIELD

This invention relates to track assemblies for a track-type machine and more particularly to a track assembly utilizing roller bushings and sprocketed idlers.

BACKGROUND ART

Conventional track assemblies utilized on track-type machines have typically consisted of a pair of parallel track chains comprised of a plurality of link members that are interconnected by laterally disposed track pins. A track bushing is commonly disposed about the pin and is secured to the links. The bushing is adapted to engage a drive sprocket that propels the track assembly about a track roller frame and ultimately provides the tractive force necessary to power the machine. In recent times and for certain applications, the bushing has taken the form of a "roller" bushing and is not fixed to the links but rather is allowed to rotate about the pin relative to both the pin and the links. This design reduces the wear between the drive sprocket and the bushings which has been known to be quite severe, especially in the abrasive conditions in which track-type machines commonly operate.

Another source of wear occurs on the link members of the track chain. The link members commonly have a wear rail defined on an inwardly directed surface that engages the wear surfaces on the guide rollers and the idlers mounted to the track roller frame. As the track assembly rotates about the track frame, the wear rails of the links are continually brought into contact with the wear surfaces and are thus subjected to severe wear. This is especially critical at the interface between the idlers and the wear rails of the links. Conventional idlers are relatively large diameter wheels that have a pair of laterally extending wear surfaces, or treads, which are positioned to contact the wear rails of the links. An idler is further identified as a non-driving wheel that is positioned between the treads and which runs between the links to act as lateral guides for the track chains at one or more ends of a track assembly. The track assembly may have a single idler in the case of a generally oval track or there may be a pair of idlers in the case of a triangular track configuration. As the generally planar surface of the wear rails is continually brought into contact with the circular idler wheel or wheels of conventional idlers, an arcuate surface begins to form on the wear rails. This wear, of course, is accelerated in more abrasive soils. When this type of wear occurs, the arcuate wear surface will create a highly uneven "platform" or "scallop" for the machine as the track chain lays on the ground and the guide rollers roll across the guide rails. This results in an extremely rough ride due to vibration which is not only uncomfortable for the operator of the machine, it is also structurally fatiguing to tractor components. Additionally, the noise of the metal on metal contact of the idlers striking the guide rails is often unpleasant and fatiguing to the machine operator.

The present invention is directed to overcoming one or more of the problems set forth above.

DISCLOSURE OF THE INVENTION

In one aspect of the present invention, a track assembly includes a chain assembly defined by a plurality of link members connected together to form a pair of parallel continuous track chains. The track chains are connected by a plurality of laterally extending pin members, each pin member having a bushing member mounted for relative rotation about the pin member. The track assembly also has a roller frame assembly having first and second end portions. A first idler having a plurality of teeth is mounted for rotation on the first end portion. The roller frame also has a second idler mounted for rotation on the second end portion. The second idler likewise has a plurality of teeth. The teeth of the first and second idlers are adapted to engage the roller bushings, which engagement entrains the chain assembly about the roller frame.

In another aspect of the present invention, a track assembly includes a roller frame assembly having first and second end portions with a first track chain defining a plurality of link members and a second track chain defining another plurality of link members, the second track chain being positioned adjacent the first track chain in a spaced, parallel relation. A plurality of pin members extends laterally between the link members of the respective track chains to connect the first and second track chains to one another. Also, a roller bushing is rotatably disposed about each of the pin members, the roller bushings being mounted for relative rotation with respect to the pin members. The first idler has teeth and is mounted on one of the end portions of the roller frame assembly. The teeth are adapted for engagement with the roller bushings to guide the track chains in relative movement with respect to the roller frame assembly. Additionally, the roller frame has a second idler having teeth. The second idler is mounted on another one of the first and second end portions of the roller frame assembly. The teeth of the second idler are likewise adapted for engagement with the roller bushings to guide the track chains for relative movement with respect to the roller frame assembly. The roller frame also has a drive wheel having teeth, but this drive wheel is mounted on a machine frame between the first and second idlers. It is likewise adapted for engagement with the roller bushings to guide the track chains for relative movement with respect to the roller frame assembly.

In yet another aspect of the present invention, a track assembly includes a chain assembly defined by a plurality of link members connected together to form a pair of parallel continuous track chains. The track chains are connected by a plurality of laterally extending pin members, each pin member having a bushing member mounted for relative rotation about the pin member. The track assembly also has a roller frame assembly having first and second end portions. A first idler having a plurality of teeth is mounted for rotation on a selected one of the end portions. The teeth of the first idler are adapted to engage the roller bushings, which engagement entrains the chain assembly about the roller frame.

With a track assembly having one or more idlers as set forth above, the contact between the wear rail surface of the track link members and the idlers is substantially eliminated. Because the guiding contact occurs between the rounded surface of the idler and the rounded surface of the bushing, the integrity of the substantially planar surface of the wear rail is maintained. Ultimately, this results in a relatively smooth interface between the guide rollers of a track assembly and the track chain, and therefore an improved ride for the machine. It also reduces the transmission of vibration and rhythmic forces into the surrounding frames and related structure which is known to be deleterious to the life of these structures. Additionally, recent testing with roller bushings combined with sprocketed idlers has been shown to improve the wear life of link members over 20 percent and to reduce track assembly noise level by approximately two decibels.

BRIEF DESCRIPTION OF THE DRAWINGS

FIG. 1 is a diagrammatic, fragmentary side view of a portion of a track assembly that embodies the principles of the present invention.

FIG. 2 is a diagrammatic, cross-sectional view taken along line 2—2 of FIG. 1.

FIG. 3 is a diagrammatic side view of a track-type work machine showing a track assembly with an elevated drive sprocket.

FIG. 4 is a diagrammatic, fragmentary, cross-sectional view of a track assembly showing the toothed portion of a sprocketed idler engaged with a roller bushing.

FIG. 5 is a diagrammatic side view of a sprocketed idler with a segmented sprocket portion.

FIG. 6 is a perspective view of an individual sprocket segment.

BEST MODE FOR CARRYING OUT THE INVENTION

Referring to FIGS. 1 and 3, an illustrative track assembly is shown generally at 10. The track assembly includes a roller frame 12 that is pivotally connected to a machine frame 13. A first or forward end portion 14 of the roller frame 12 is shown that defines a first mounting portion 16 such as a pillow block or split mounting flange. First mounting portion 16 receives a mounting shaft 18 of a first idler 20. First idler 20 is mounted to the roller frame 12 for rotation with respect thereto. Likewise, as may be seen in FIG. 3, a second idler 80 may be mounted to a second end portion 84 of roller frame 12 in an essentially identical manner as that described above. While not shown, it is to be understood that the track assembly may have only one idler which may be mounted at either the first or second end portion.

Referring to FIGS. 1 and 2, the track assembly 10 includes a chain assembly 66 defined by first track chain 22 and a second track chain 24 and their connecting members. Each track chain 22, 24 is comprised of a plurality of substantially identical link members 26 that are pinned together in end-to-end fashion to form the respective track chains. As is best seen in FIG. 2, a pair of adjacent links are shown pinned together in cross-section. First track chain 22, shown on the left side of the drawing, has a first end portion 28 of a first link 30 spaced laterally inward from a second end portion 32 of a second link 34. Likewise, on the right side of the assembly shown in FIG. 2, the second track chain 24, whose links are mirror images of the links in the first track chain 22. FIG. 2 shows a first end portion 36 of a first link 38 spaced laterally inward from a second end portion 40 of a second link 42 in second track chain 24.

The first end portions 28 and 36 of the respective first links 30 and 38 define a pair of respective bores 44 and 46 that are aligned with one another along a common centerline X. The second end portions 32 and 40 of the second links 34 and 42 of the respective track chains 22 and 24 also define a bore 48 and 50 that is also aligned along the centerline X. A pin member 52 is received within the aligned bores and is secured to the second end portions 32 and 40 of the links 34 and 42 by press-fit or similar manner that will securely fasten the pin member thereto. A sleeve bearing 54 is press-fit into the bores 44 and 46 of the links 30 and 38 and provides a sealing face for a track seal 56 which is positioned on one side of the sleeve bearing 54 to seal a portion of the track assembly in a well known manner. The sleeve member 54 also works in conjunction with the bores 44 and 46 to form a portion of a seal cavity for a second seal 58. The second seal 58 bears against a face defined by a bushing member 60, which will be described in more detail hereinafter, and also functions to seal a portion of the track assembly 10.

The bushing member 60 defines a bore 62 that is slightly larger than the outer diameter of the pin member 52 and is positioned about the pin member between the first end portions 28 and 36 of the links 30 and 38. The bushing member 60 is free to rotate with respect to the pin member 52 and the links 30 and 38.

Each link 30, 34, 38 and 42 of the respective track chains defines an inwardly-directed wear rail 64, which is best shown in FIG. 2. The wear rails, in turn, define an inwardly-directed surface 65. The wear rail 64 is designed to provide a surface which engages a plurality of guide rollers 67 which are mounted along a lower run of the track roller frame, which are best seen in FIGS. 1 and 3. However, in the present invention, the wear rails 64 do not interact with the sprocketed idlers as explained herein.

As can be seen in FIGS. 2 and 4, first idler 20 has a toothed or sprocketed portion 76. The sprocketed portion 76 of first idler 20 defines an outer contact surface 78 that has a width that is substantially equal to that of the roller bushing 60 and is just wide enough to fit between the inner portions of the links of track chains 22 and 24 without contacting wear rail surface 65. It is to be understood that as described herein and seen in FIG. 3, second idler 80 is shaped and functions in a substantially identical manner to first idler 20 yet the chain assembly 66 engages second idler 80 less than 180 degrees of its circumference.

As is shown in FIG. 3, a drive wheel 86 in the form of a drive sprocket is elevationally above and laterally between first idler 20 and second idler 80. The drive sprocket 86 is mounted to machine frame 13 and has teeth 76 which engage roller bushings 60 similarly to teeth 76 on first idler 20 and second idler 80. The drive sprocket transmits a rotational, motive force from the machine frame 13 to the track assembly 10. It is further observed that chain assembly 66 engages the teeth of second idler 80 less than 180 degrees about the circumference of the idler.

With reference to FIGS. 5 and 6, an alternate embodiment of the toothed or sprocketed portion 76' of the first idler 20' is shown. In this embodiment, the sprocketed portion 76' has multiple, arcuate sprocket segments 77 which are removably fastened onto the first idler 20'. While not shown, it is to be understood that other idlers may be fashioned with segmented sprocket portions.

INDUSTRIAL APPLICABILITY

When assembled, the track assembly 10 is entrained about the roller frame 12 in a manner wherein the sprocketed portions 76 of first and second idlers 20, 80 and of drive sprocket 86 are positioned between the link members 26 of the respective track chains 22 and 24. Being so positioned, the contact surface 78 defined by the rounded portion 76 is in direct contact with roller bushing 60.

Since the roller bushing 60 is allowed to rotate with respect the pin member 52 and the links, the wear between them and the idler member 20 is greatly reduced. Further, the wear rails 64 defined by the links are not brought into contact with the idlers as the track chains rotate around the idlers. Since the flat surface of the wear rails 64 is not in contact with the circular idlers, there is no tendency for the wear surfaces 65 to be worn to an arcuate configuration. This maintains a relatively flat surface that forms a platform for the track rollers 67 as they move across the wear rails as they contact the ground. This ultimately results in less vibrations and a smoother ride for the operator of the machine which is less fatiguing over the course of a shift, making him more productive in his operation of the machine and extending the life of tractor components.

Other aspects, objects and advantages of this invention can be obtained from a study of the drawings, the disclosure and the appended claims.

What is claimed is:

1. A track assembly having a chain assembly defined by a plurality of link members, having a wear rail and connected together to form a pair of parallel continuous track chains, comprising:

a plurality of laterally extending pin members connecting said track chains, each pin member having a bushing member mounted for relative rotation about the pin member;

a roller frame assembly having first and second end portions;

a first idler mounted for rotation on said first end portion and having a plurality of teeth defined thereabout; and a second idler mounted for rotation on said second end portion and having a plurality of teeth defined thereabout, the teeth of said first and second idlers being adapted to engage said roller bushings to entrain the chain assembly about the roller and substantially eliminate contact with said wear rail.

2. The track assembly as set forth in claim 1 wherein said track assembly is pivotally connected to a machine frame.

3. The track assembly as set forth in claim 1 further comprising a drive sprocket mounted on said machine frame at a location elevational above and between said first and second idlers, said drive sprocket having teeth and being drivingly connected to said machine frame and adapted to engage said roller bushings to entrain the chain assembly and cause rotation of the chain assembly about the roller frame.

4. A track assembly as set forth in claim 1 further comprising a plurality of rollers connected to said roller frame and disposed between said first and second idlers.

5. A track assembly as set forth in claim 3 further comprising a plurality of rollers connected to said roller frame and disposed between said first and second idlers.

6. A track assembly as set forth in claim 1 wherein each said link member has a wear rail surface, said idlers rotating between said link members in a substantially non-contacting relationship to said wear rail surfaces.

7. A track assembly as set forth in claim 3 wherein said chain assembly engages the teeth of said second idler less than 180 degrees.

8. A track assembly comprising:

a roller frame assembly having first and second end portions;

a first track chain defining a plurality of link members, having a wear rail;

a second track chain defining a plurality of link members, said second track chain being positioned adjacent the first track chain in a spaced, parallel relation thereto;

a plurality of pin members extending laterally between the link members of the respective track chains to connect the first and second track chains to one another;

a plurality of roller bushings rotatably disposed about each of the pin members, said roller bushings being mounted for relative rotation with respect to the pin members;

a first idler having teeth, said first idler being mounted on a selected one of said first and second end portions of the roller frame assembly and being adapted for engagement with the roller bushings to guide the track chains for relative movement with respect to the roller frame assembly;

a second idler having teeth, said second idler being mounted on another selected one of said first and second end portions of the roller frame assembly and being adapted for engagement with the roller bushings to guide the track chains for relative movement with respect to the roller frame assembly; and a drive wheel having teeth, said drive wheel being mounted on a machine frame between said first and second idlers and being adapted for engagement with the roller bushings to guide the track chains for relative movement with respect to the roller frame assembly and substantially eliminate contact with said wear rail.

9. The track assembly as set forth in claim 8 wherein said drive wheel is connected to a driving mechanism.

10. A track assembly as set forth in claim 8 further comprising a plurality of rollers connected to said roller frame and disposed between said first and second idlers.

11. A track assembly as set forth in claim 8 wherein said chain assembly engages the teeth of said second idler less than 180 degrees.

12. A track assembly having a chain assembly defined by a plurality of link members, having a wear rail and connected together to form a pair of parallel continuous track chains, comprising:

a plurality of laterally extending pin members connecting said track chains, each pin member having a bushing member mounted for relative rotation about the pin member;

a roller frame assembly having first and second end portions; and a first idler mounted for rotation on a selected one of said end portions and having a plurality of teeth defined thereabout, the teeth of said first idler being adapted to engage said roller bushings to entrain the chain assembly about the roller and substantially eliminate contact with said wear rail.

13. A track assembly having a chain assembly defined by a plurality of link members, having a wear rail and connected together to form a pair of parallel continuous track chains, comprising:

a plurality of laterally extending pin members connecting said track chains, each pin member having a bushing member mounted for relative rotation about the pin member;

a roller frame assembly having first and second end portions;

a first idler mounted for rotation on said first end portion and having a plurality of teeth defined thereabout; and a second idler mounted for rotation on said second end portion and having a plurality of teeth defined thereabout, the teeth of said first and second idlers being adapted to engage said roller bushings to entrain the chain assembly about the roller and substantially eliminate contact with said wear rail, wherein the teeth of said first and second idlers are removably attached to said idlers.

14. A track assembly comprising: a roller frame assembly having first and second end portions;

a first track chain defining a plurality of link members, having a wear rail;

a second track chain defining a plurality of link members, said second track chain being positioned adjacent the first track chain in a spaced, parallel relation thereto;

a plurality of pin members extending laterally between the link members of the respective track chains to connect the first and second track chains to one another;

a plurality of roller bushings rotatable disposed about each of the pin members, said roller bushings being mounted for relative rotation with respect to the pin members;

a first idler having teeth, said first idler being mounted on a selected one of said first and second end portions of the roller frame assembly and being adapted for engagement with the roller bushings to guide the track chains for relative movement with respect to the roller frame assembly;

a second idler having teeth, said second idler being mounted on another selected one of said first and second end portions of the roller frame assembly and being adapted for engagement with the roller bushings to guide the track chains for relative movement with respect to the roller frame assembly, wherein the teeth of said first and second idlers are removably attached to said idlers; and a drive wheel having teeth, said drive wheel being mounted on a machine frame between said first and second idlers and being adapted for engagement with the roller bushings to guide the track chains for relative movement with respect to the roller frame assembly and substantially eliminate contact with said wear rail.

15. A track assembly having a chain assembly defined by a plurality of link members, having a wear rail and connected together to form a pair of parallel continuous track chains, comprising:

a plurality of laterally extending pin members connecting said track chains, each pin member having a bushing member mounted for relative rotation about the pin member;

a roller frame assembly having first and second end portions; and a first idler mounted for rotation on a selected one of said end portions and having a plurality of teeth defined thereabout, the teeth of said first idler being adapted to engage said roller bushings to entrain the chain assembly about the roller and substantially eliminate contact with said wear rail, wherein the teeth of said idler are removably attached to said idler.

* * * * *